United States Patent [19]

Terui

[11] Patent Number: 4,488,186

[45] Date of Patent: Dec. 11, 1984

[54] TAPE RUN CONTROL DEVICE FOR MICROCASSETTE TAPE RECORDER

[75] Inventor: Nobuo Terui, Hachioji, Japan

[73] Assignee: Olympus Optical Co., Ltd., Tokyo, Japan

[21] Appl. No.: 443,455

[22] Filed: Nov. 22, 1982

[30] Foreign Application Priority Data

Dec. 1, 1981 [JP] Japan .......................... 56-179365[U]

[51] Int. Cl.³ .................... G11B 5/008; G11B 15/00
[52] U.S. Cl. .................... 360/71; 360/72.1; 360/74.1
[58] Field of Search ............. 360/71, 72.1, 74.1, 360/745, 93, 96.1, 96.2

[56] References Cited

FOREIGN PATENT DOCUMENTS 51-21806 2/1976 Japan .

Primary Examiner—George G. Stellar
Attorney, Agent, or Firm—Frishauf, Holtz, Goodman and Woodward

[57] ABSTRACT

An auto-reverse type tape recorder for a cassette having a side A and side B in which a side A playback mode, side B playback mode, side A fast mode and side B fast mode can be directly designated at an operation-designating section irrespective of the direction in which the cassette is loaded into the tape recorder. The operation-designating section has operation members for designating the side A playback mode, side B playback mode, side A fast mode and side B fast mode. The tape recorder further includes a cassette loading direction detector responsive to a side-discriminating portion, such as a cutout or recess, provided on a predetermined side of the cassette and a switch circuit responsive to the side-discriminating portion to switch a connection between the output terminals of the operation-designating section and the control input terminals of a motor control circuit.

3 Claims, 5 Drawing Figures

FIG. 1
(PRIOR ART)
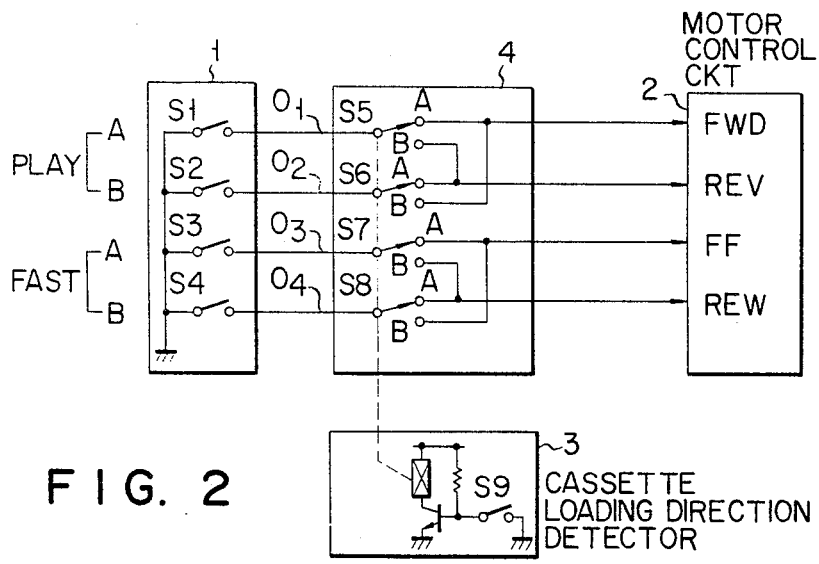
FIG. 2
FIG. 3
(PRIOR ART)
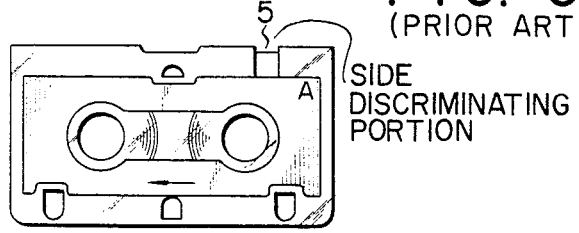
FIG. 4
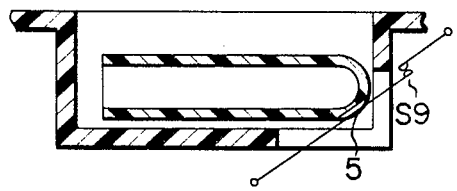

TAPE RUN CONTROL DEVICE FOR MICROCASSETTE TAPE RECORDER

BACKGROUND OF THE INVENTION

This invention relates to a tape run control device for an auto-reverse type tape recorder for use with cassettes having a side A and side B.

FIG. 1 shows a general arrangement of operation buttons of a conventional auto-reverse type tape recorder. In this arrangement, FF (fast forward), FWD (forward playback or recording), REV (reverse playback or recording) and REW (rewinding) operation buttons are provided to designate the direction in which a magnetic tape runs at a slow speed (recording/playback speed) or a fast speed. In the operation system, when a desired music program recorded on the cassette tape is to be reproduced, it is necessary to check the direction in which the cassette is loaded, i.e., on which side (side A or side B) the cassette is set upward. In other words, it is impossible to directly designate the side A playback mode or the side B playback mode. It is necessary therefore to designate the tape run direction in accordance with the cassette loading direction. When recording is performed, it is also necessary to check the cassette loading direction.

SUMMARY OF THE INVENTION

It is accordingly an object of this invention to provide a cassette tape run control device which can directly designate a playback (recording) or a fast mode on a desired side of a tape cassette irrespective of the direction in which the cassette is loaded, i.e., without checking the side on which the cassette is set upward.

According to this invention, an operation-designating section has operation members for designating, at least, a side A playback (recording), side B playback (recording), side A fast and side B fast run. When an operation member is operated, an operation signal is supplied to a corresponding output terminal. A motor control circuit adapted to control a motor for running a cassette tape has, at least, a first control input terminal for normal speed forward run, second control input terminal for normal speed reverse run, third control input terminal for fast forward run and fourth control input terminal for fast reverse run. When an operation signal from the operation section is supplied to one of these control inputs, the motor is controlled accordingly. The cassette has a side-discriminating portion, such as a cutout or recess, on the edge portion of a predetermined side, i.e., a predetermined cassette half. The tape recorder includes a detector means responsive to the side-discriminating portion of the cassette to detect the direction in which the cassette is loaded. A switch circuit responsive to the side detector is connected between the output terminals of the operation section and the control input terminals of the motor control circuit to switch the connection state between the output terminals and the control input terminals. When the cassette is loaded with, for example, the side A up, if the side A playback mode is designated, the tape runs at the normal speed in the forward direction to reproduce the side A. If in this case the side B playback mode is designated, the tape runs in the reverse direction to reproduce the side B. The same thing can be said for the fast run mode. According to this invention, therefore, it is possible to directly designate the side A playback (recording) mode, side B playback (recording) mode, and side A and side B fast modes at the operation section.

BRIEF DESCRIPTION OF THE DRAWINGS

FIG. 1 shows an operation section of a conventional auto-reverse type tape recorder;

FIG. 2 shows a tape run control device according to this invention;

FIG. 3 shows a conventional microcassette having a side-discriminating portion;

FIG. 4 shows a relationship between the side-discriminating portion of the microcassette and a switching element of a microcassette loading direction detector.

DETAILED DESCRIPTION OF THE PREFERRED EMBODIMENT

Figure 5:
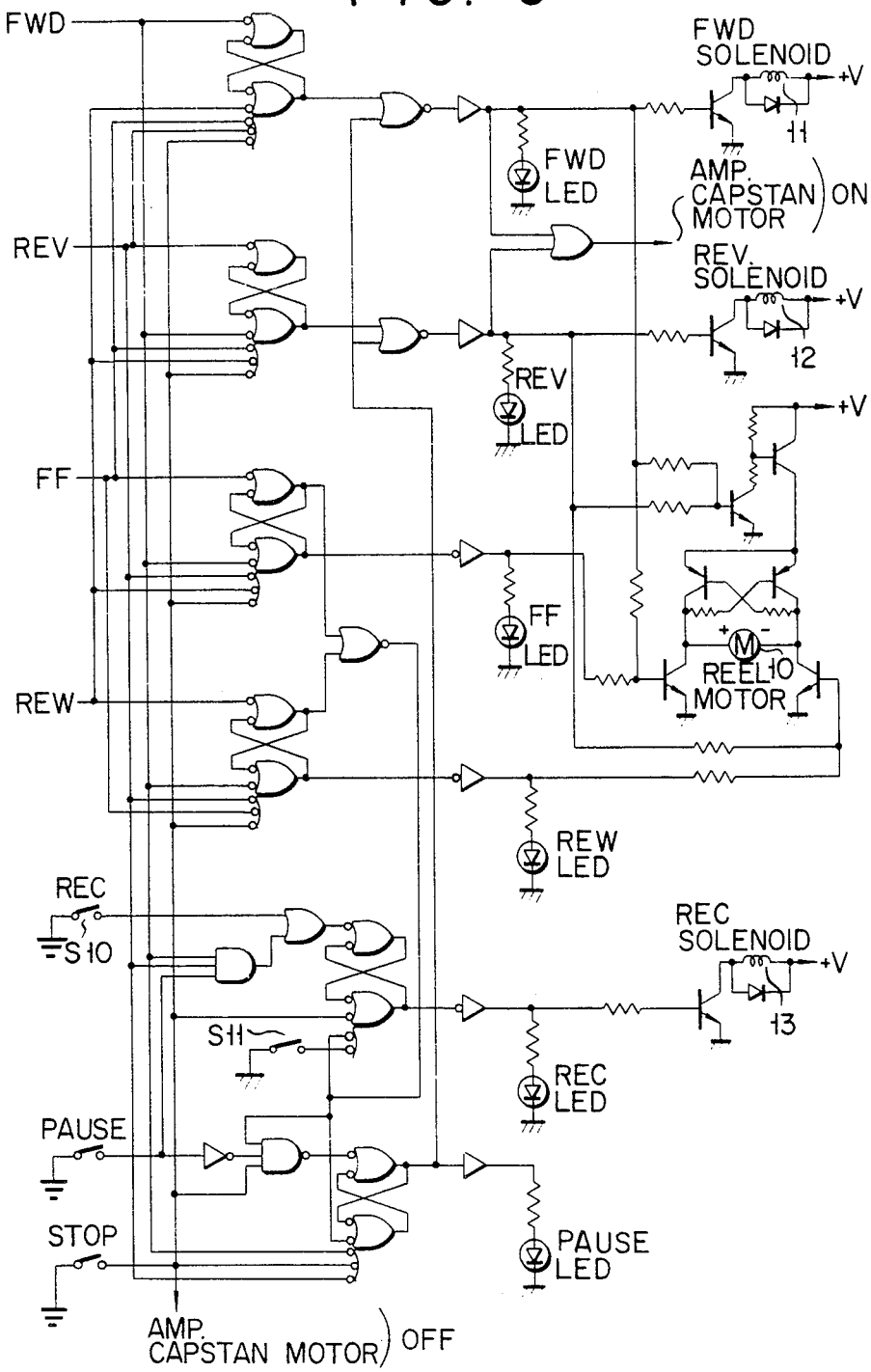
FIG. 5 shows a practical arrangement of a motor control circuit.

In the following, the description is given with reference to a microcassette system by way of example.

In FIG. 2, an operation designating section 1 includes operation members $S_1$ to $S_4$ for designating, at least, a side A playback, side B playback, side A fast and side B fast run. A motor control circuit 2 includes a normal-speed forward run control input terminal (FWD), normal-speed reverse run control input terminal (REV), fast-forward run control input terminal (FF) and fast-reverse run control input terminal (REW). When an operational signal from operation section 1 is selectively applied to one of the control input terminals, motor control circuit 2 controls a motor (not shown) to permit the run state of a cassette tape to be controlled. Reference numeral 3 designates a microcassette loading direction detector. The microcassette has a side A/side B discriminating portion 5, such as a cutout or recess, which is provided on an edge portion of a predetermined side of the microcassette as shown in FIG. 3. When the microcassette is loaded into the tape recorder, detector 3 detects the microcassette loading direction by a switch $S_9$ being turned ON or OFF by side-discriminating portion 5 as shown in FIG. 4.

Reference numeral 4 denotes a switch circuit. Upon receipt of a signal from detector 3, switch circuit 4 switches a connection between side A and side B playback output terminals $O_1$ and $O_2$ of operation section 1 and the normal forward and reverse run control input terminals (FWD) and (REV) of motor control circuit 2 and a connection between side A and side B fast run output terminal $O_3$ and $O_4$ of operation section 1 and the fast forward and reverse run control input terminals (FF) and (REW).

Now suppose that in this control device switches $S_5$ to $S_8$ of switch circuit 4 are switched to the side A when the microcassette is loaded into the tape recorder in a predetermined direction. In this case, operation members $S_1$ to $S_4$ of operation section 1 are connected to control input terminals FWD, REV, FF and REW of control circuit 2. When operation member $S_1$ for side A playback designation is operated, an operation signal is supplied to FWD control input terminal of control circuit 2, whereby the side A of a cassette tape is reproduced or recorded. When the microcassette is loaded into the tape recorder in the opposite direction, switches $S_5$ to $S_8$ of switch circuit 4 are switched to side B. If, in this state, operation member $S_1$ is operated, an operation signal is supplied to REV control input terminal of control circuit 2, causing the motor to be driven at normal speed in the reverse direction to permit the side A of microcassette to be reproduced or recorded. If the other operation members are operated, the same operation modes can be obtained in similar manner.

According to this invention, therefore, a desired-side playback (or recording) and fast mode can be directly designated irrespective of the direction in which the microcassette is loaded.

FIG. 5 shows a practical arrangement of the motor control circuit or auto-reverse mechanism control circuit. This arrangement is for a dual-capstan auto-reverse system. In the dual-capstan auto-reverse system a switching between the FWD mode and the REV mode is made by selectively moving one of a pair of pinch rollers into abutment against the corresponding capstan and the other away from the corresponding other capstan with a capstan motor kept rotated and switching the direction in which a reel motor rotates.

When an operation signal is supplied to FWD control input terminal reel motor 10 is rotated at slow speed in the forward direction and an FWD solenoid 11 is energized, causing the FWD pinch roller to abut against the FWD capstan to permit the tape to run in the forward direction. When the operation signal is supplied to REV control input terminal reel motor 10 is rotated at slow speed in the direction and FWD solenoid 11 and REV solenoid 12 are deenergized and energized, respectively, so that the FWD pinch roller moves away from the FWD capstan while the REV pinch roller abuts against the REV capstan. As a result, the tape runs at slow speed in the backward direction. When an operation signal is supplied to FF control input terminal or REW control input terminal, reel motor 10 is driven at high speed in the forward or backward direction. When an operation signal is supplied to REC control input terminal a REC solenoid 13 is energized to move an erase head. In order to set an REC mode it is necessary to simultaneously actuate the REC designation operation member $S_{10}$ and either one of operation member $S_1$ and $S_2$. $S_{11}$ shows an erroneous erasure prevention switch.

What is claimed is:

1. A magnetic tape run control device for an auto-reverse cassette type tape recorder, the cassette having sides A and B, comprising:
    an operation section having operation members for designating a side A playback mode, side B playback mode, side A fast mode and side B fast mode and arranged to, when an operation member is operated, provide an operation signal to a corresponding output terminal;
    a motor control circuit having a first control input terminal for normal forward run, second control input terminal for normal reverse run, third control input terminal for fast forward run and fourth control input terminal for fast reverse run and responsive to an operation signal selectively applied to one of said control input terminals thereof for controlling a motor adapted to drive a magnetic tape;
    cassette loading direction detecting means for detecting the loading direction of a cassette when loaded into the tape recorder; and
    switch circuit means responsive to said cassette loading direction detecting means for switching a connection between side A and side B playback mode output terminals of said operation section and said first and second control input terminals of said motor control circuit and a connection between side A and side B fast mode output terminals of said operation section and said third and fourth control input terminals of said motor control circuit such that, in the first state thereof, said side A and side B playback mode output terminals are connected to said first and second control input terminals, respectively, and said side A and side B fast mode output terminals are connected to said third and fourth control input terminals, respectively, and, in the second state thereof, said side A and side B playback mode output terminals are connected to said second and first control input terminals, respectively, and said side A and side B fast mode output terminals are connected to said fourth and third control input terminals, respectively.

2. A magnetic tape run control device according to claim 1, in which said cassette has a side-discriminating portion at a predetermined side thereof and said cassette loading direction detecting means comprises a switch which is responsive to said side-discriminating portion of said cassette to be turned ON or OFF when said cassette is loaded into said tape recorder.

3. A magnetic tape run control device according to claim 1, wherein said cassette is a microcassette.

* * * * *